Oct. 24, 1939.  J. E. HAINES  2,177,597
SUMMER-WINTER AIR CONDITIONING SYSTEM
Filed Oct. 16, 1936   2 Sheets-Sheet 1

FIG. 1

Inventor
John E. Haines
By George H. Fisher  Attorney

FIG. 2

Inventor
John E. Haines
By George H Fisher
Attorney

UNITED STATES PATENT OFFICE 2,177,597

SUMMER-WINTER AIR CONDITIONING SYSTEM

John E. Haines, Minneapolis, Minn., assignor to Minneapolis-Honeywell Regulator Company, Minneapolis, Minn., a corporation of Delaware Application October 16, 1936, Serial No. 105,898

23 Claims. (Cl. 257—3)

This invention relates to air conditioning systems and more particularly to those systems which are adapted to cool a plurality of spaces or enclosures in summer and to heat such spaces or enclosures in the winter, the cooling or heating of each space or enclosure being individually controlled.

In accordance with one form which my invention may take, an air conditioning chamber is provided with a steam coil for heating the air in winter and with a refrigeration coil for cooling the air in summer. This conditioning chamber is connected by a delivery duct with a plurality of spaces or zones and is also connected by means of a return duct to such zones. The conditioned air inlet for each zone is controlled by a motor positioned damper, the position of the damper being varied by means of a thermostat responsive to the temperature of the corresponding zone. The thermostat for each zone is provided with an outdoor compensating means for adjusting such thermostat to maintain a comfort temperature during winter operation and for causing progressively rising inside temperatures with increasing outside temperatures during summer operation. The operation of the heating and cooling devices in the conditioning chamber are controlled by means of a thermostat responsive to the average temperature of the various zones. This thermostat is arranged to be selectively connected to either the refrigeration controlling means or to the steam supply controlling means and is also provided with an outdoor compensating thermostat for maintaining a minimum average building temperature during the winter and for maintaining an average temperature which increases with outdoor temperature during summer operation. Means are also provided for admitting fresh air to the conditioning chamber during both summer and winter operation, the amount of fresh air admitted being automatically controlled conjointly by the heating and cooling device controllers. This therefore forms one object of my invention.

Another object of my invention is to provide an air conditioning system having a means for heating in winter and a means for cooling in summer, these heating and cooling means being selectively controlled by a single controller responsive to the temperature of the space being conditioned, this space temperature responsive controller being adjusted by an outdoor compensating thermostat to maintain a minimum comfortable space temperature in winter and to maintain a space temperature in summer which varies in a predetermined relationship with outdoor temperature.

Another object is to provide an air conditioning system in which a space to be conditioned is selectively supplied with a heating or cooling medium under the control of a thermostat responsive to the space temperature, such thermostat being automatically adjusted in accordance with outdoor temperature by a compensating thermostat, the space temperature responsive thermostat being connected to its control device so as to permit proper control of the conditioning medium both in summer and in winter.

A further object is to provide a zone controlled air conditioning system with a means for heating a conditioning medium in winter and for cooling such medium in summer, the quantity of conditioning medium supplied to the various zones being controlled in accordance with the condition in the respective zones by individual zone condition controllers, these controllers being reversible to obtain proper operation in both summer and winter and having compensating or adjusting means for varying the value of the condition maintained in accordance with outdoor temperature.

A still further object of my invention is to provide a zone controlled air conditioning system in which the temperature of the air supplied to the various zones is controlled both in summer and in winter in accordance with the average temperature of the various zones, and is further controlled in summer by an outdoor compensator for progressively increasing the air temperature as the outside temperature decreases and in which the quantity of the air supplied to each zone is controlled by controllers responsive to the condition of the individual zones.

Another object is to provide a summer and winter air conditioning system in which the supply of fresh air is controlled by the conjoint action of the heating and cooling means to maintain the proper supply of fresh air for various outdoor conditions.

A further object of my invention is to provide a summer and winter air contitioning system with means for progressively varying the cooling effect of the air supplied in summer as the space temperature rises and for progressively raising the heating effect of the air supplied in winter as the space temperature decreases and in which the supply of fresh air is automatically controlled by the conjoint action of the heating and cooling means.

Further objects will appear from the following description and the appended claims.

For a more complete understanding of the invention, reference may be had to the following detailed description and the accompanying drawings, in which.

Figure 1:
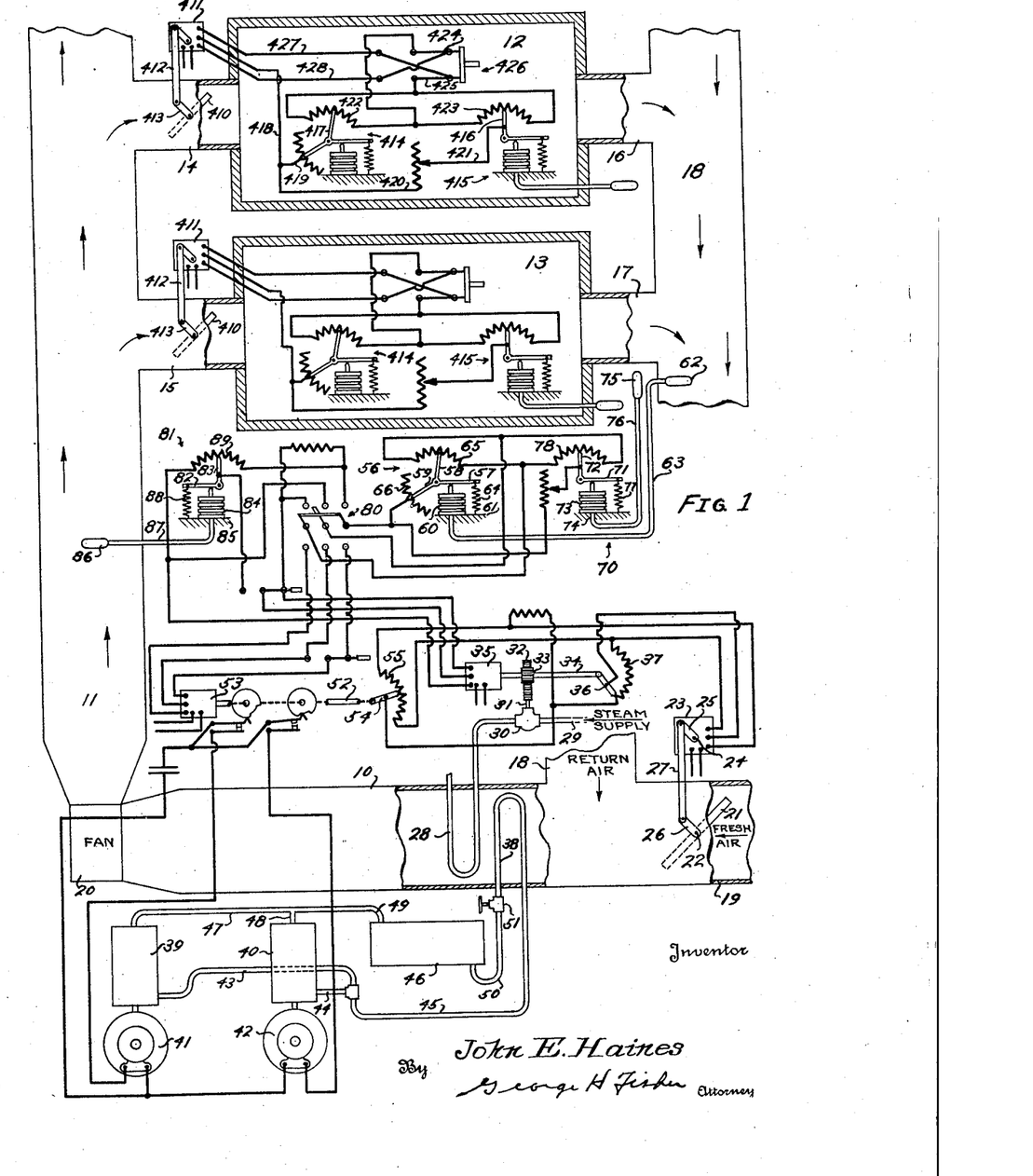
Figure 1 is a diagrammatic showing of one form of the present invention.

Referring first to Figure 1 of the drawings, an air conditioning device is herein indicated as comprising an air conditioning chamber 10. This air conditioning chamber 10 is connected with a delivery duct 11 by means of which the conditioned air is delivered to the spaces to be controlled. The system of the present invention is of the type known as a "zone controlled system" wherein the supply of conditioned air is delivered to a plurality of spaces or group of spaces in accordance with the requirements of such spaces or group of spaces. In the instant illustration, only two spaces are shown although it will be obvious that a larger number could be supplied and actually would be supplied in practice from this single air conditioning chamber 10. These two spaces are indicated at 12 and 13 and communicate with the delivery duct 11 by means of branch ducts 14 and 15 respectively. Outlet ducts 16 and 17 communicate with the two rooms or spaces 12 and 13 and also communicate with a return duct 18 which is connected to the air conditioning chamber 10. The air conditioning chamber 10 is further connected to the outside atmosphere by means of a fresh air inlet duct 19. A fan 20, which may be continually driven or intermittently driven in any desired manner serves to withdraw air from the spaces 12 and 13 and from the outside atmosphere, pulling it though the air conditioning chamber 10, and forcibly delivering it through the delivery duct 11 into the rooms or spaces 12 and 13.

The proportions of fresh and return air which are drawn into the air conditioning chamber 10 are determined by a damper 21, which is located in the fresh air inlet duct 19 and secured to a pivoted shaft 22. This damper 21 is positioned by motor mechanism 23, which is provided with a main operating shaft 24. A crank 25, which is secured to the main operating shaft 24 of the motor mechanism 23 is connected to a similar crank 26, which is secured to the damper shaft 22, by means of a link 27. It will be obvious that upon movement of the main operating shaft 24 the damper 21 is moved towards open or closed position and thereby varies the amount of fresh air which may be drawn into the air conditioning chamber 10. Since the fan 20 has a definite capacity such movements of the damper 21 will also vary the amount of return air drawn into the air conditioning chamber 10. If desired, a second damper may be located in the return air duct 18 and operated in a reverse manner in respect to the damper 21 as is well known in the art.

Located in the air conditioning chamber 10 is a heating coil 28 which is supplied with a heating fluid such as steam from any suitable source. In this illustration of the invention, the heating coil 28 is shown connected to a steam supply pipe 29. The flow of steam to this heating coil 28 is controlled by valve 30 which is provided with a valve stem 31 to which a rack 32 is secured. Cooperating with rack 32 is a pinion 33 which is secured to the main operating shaft 34 of a motor mechanism 35. This main operating shaft 34 not only positions the valve 30, but also positions a control arm 36 that cooperates with a control resistance 37 for the purpose of controlling the motor mechanism 23 in a manner which will be described in detail hereinafter.

Also located in the air conditioning chamber 10 is cooling coil 38 which comprises the expansion coil of a mechanical refrigeration system. This refrigeration system includes first and second compressors 39 and 40 which are respectively driven by first and second compressor motors 41 and 42. These compressors are connected to the discharge end of the cooling coil 38 by pipes 43, 44 and 45 and serve to withdraw the refrigerant therefrom and compress the same in the usual manner. The compressed gaseous refrigerant is then delivered to a condenser 46 by means of pipes 47, 48 and 49. The hot gaseous refrigerant is liquefied in the condenser and is then delivered to the cooling or expansion coil 38 by means of a pipe 50 through an expansion valve 51. Such mechanical refrigeration systems are well known and no further description thereof is thought to be necessary.

Energization of the compressor motors 41 and 42 is controlled by switching mechanism, to be described in detail hereinafter, which is operated by the main shaft 52 of a motor mechanism 53. This main shaft 52 also operates a control arm 54 that cooperates with a control resistance 55 which in turn controls the motor mechanism 23 under certain conditions.

The motor mechanisms 35 and 53 are primarily controlled by a return air temperature controller indicated generally at 56. This controller 56 includes a bell crank having an actuating arm 57, a control arm 58 and a corrector arm 59. The bell crank is positioned by bellows 60, one end of which is secured to a support 61 and the other end of which bears against the actuating arm 57. This bellows is connected with a control bulb 62 by means of a connecting tube 63. The bellows, bulb, and tube are charged with volatile fluid, as is well known in the art wherefor variable pressures are secured in bellows 60 upon variations in temperature of the bulb 62. These variable pressures are opposed by a coil spring 64 which has one of its ends secured to the actuating arm 57 and the other end secured to the support 61. The bulb 62 may respond to any desired temperature but in the instant application it responds to the average temperature of the spaces or rooms 12 and 13 by being placed in the return air duct 18. The control arm 58 cooperates with a control resistance 65 and the corrector arm 59 cooperates with a corrector resistance 66.

The range of response of this controller 56 is relatively great and in this particular embodiment of the invention the control arm 58 engages the extreme right hand end of controller resistance 65 when the return air temperature is substantially 75° F. and engages the extreme left hand end of this control resistance 65 when the return air temperature rises to 85° F. The operating range of this controller 56 is much smaller than its total range and the operating range of the controller is selectively shifted within its total range by means of an outdoor temperature responsive controller which is indicated generally at 70. This outdoor temperature responsive control 70 includes a bell crank having an actuating arm 71 and a compensating arm 72. The bell crank is positioned by bellows 73 which has one of its ends secured to a suitable support 74, its other end engaging the actuating arm 71. The bellows 73 is connected to a controlling bulb 75 by means of a connecting tube 76. The bellows, bulb, and tube are charged with a suitable volatile fluid so that various pressures are created in the bellows 73 upon changes of temperature at the controlling bulb 75. A coil spring 77 has one of its ends secured to the actuating arm 71 and its other end secured to the support 74 and serves to oppose the variable pressures created in bellows 73 upon temperature change. As indicated above, the controlling bulb 75 responds to outdoor temperature. The compensating arm 72 cooperates with a compensating resistance 78 and the range of this instrument is such that the compensating arm 72 engages the extreme right hand end of compensating resistance 78 when the outside temperature is 75° F. As the outside temperature rises, the compensating arm 72 moves along compensating resistance 78 towards its left hand end and engages the extreme left hand end thereof when the outdoor temperature rises to 105° F.

The controller 56 and the outdoor compensator 70 are adapted to be selectively connected either to the motor mechanism 35 or to the motor mechanism 53 by means of a triple pole double switch indicated generally at 80. In addition, the motor mechanism 35 is further adapted to be controlled by a low limit control generally indicated at 81. This low limit control includes a bell crank having an actuating arm 82 and a control arm 83. One end of the bellows 84 positions the actuating arm 82 and the other end of this bellows is secured to a suitable support 85. The bellows is connected to a controlling bulb 86 through a connecting tube 87. The bellows, bulb, and tube are charged with volatile fluid and the variable pressures created in bellows 84 upon temperature change at the bulb 86 are opposed by a coil spring 88 which has one of its ends secured to the actuating arm 82 and its other end secured to the support 85. The control arm 83 cooperates with a control resistance 89. The bulb 86 is located in the delivery duct 11 and therefore responds to the temperature of the delivered air. The range of this instrument is such that the control arm 83 engages the left end of control resistance 89 when the temperature of the delivered air falls to 60° F., and engages the right hand end thereof when the delivered air temperature rises to 63° F.

Figure 2:
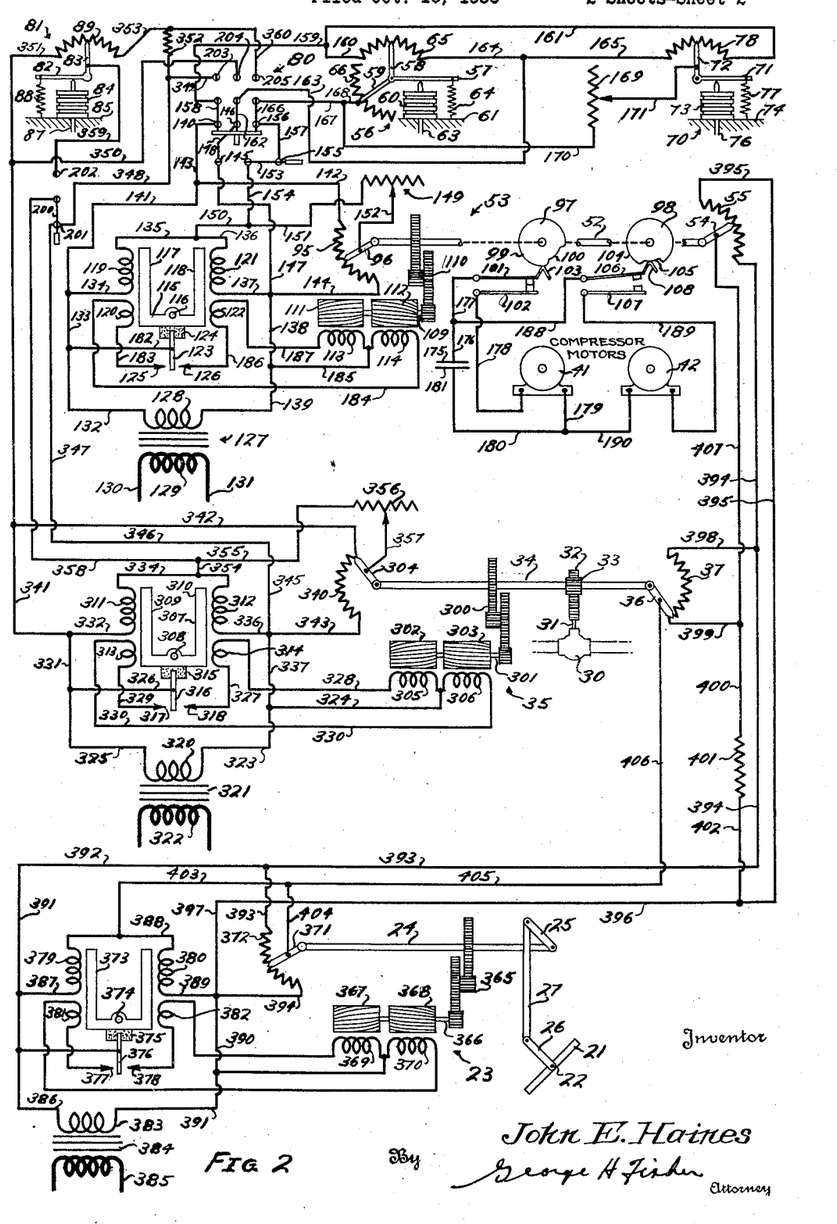
Figure 2 is a detailed wiring diagram of certain of the devices which are not shown in detail in Figure 1.

Turning now to Fig. 2 of the drawings, the detailed manner in which the heating and cooling of the air passing through the air conditioning chamber 10 and the manner in which the fresh air damper 21 are controlled will be explained. The parts are shown as operated on a summer cycle with the outdoor temperature intermediate 75° F. and 105° F. or at approximately 90° F., the return air temperature intermediate 75° F. and 85° F. or substantially 80°. The delivered air temperature, with the parts in the position shown, is between 60 and 63° F., which possibly would not be the case for summer operation, but this value has been selected to facilitate the description of the winter cycle of the apparatus hereinafter. The main operating shaft 52 of the motor mechanism 53 not only operates the control arm 54 but additionally operates a balancing potentiometer and a pair of switch actuating cams. The balancing potentiometer includes a balancing resistance 95, which is relatively stationary, and a balancing contact 96 that is operated by the main operating shaft 52. The cams referred to above are indicated at 97 and 98. The cam 97 is provided with a high portion 99 and a low portion 100. This cam positions a switch arm 101 which cooperates with a switch arm 102. The arrangement is such that when the follower 103 of the switch arm 101 is engaged with the high portion 99 of the cam 97, the switch arm 101 is engaged with the switch arm 102. When the follower 103 engages the low portion 100 of the cam 97, the switch arm 101 disengages the switch arm 102. The cam 98 is similarly provided with a high portion 104 and a low portion 105. This cam positions a switch arm 106 that cooperates with a switch arm 107. The switch arm 106 is provided with a follower 108. When this follower 108 engages the low portion 105 of cam 98, the switch arm 106 is disengaged from switch arm 107 as shown. When the follower 108 engages the high portion 104 of cam 98, switch arm 106 engages switch arm 107.

The main shaft 52 is driven by a rotor shaft 109 to which it is coupled through reduction gearing 110. Secured to rotor shaft 109 is a pair of motor rotors 111 and 112. Cooperating with these rotors are field windings 113 and 114. These two rotors and field windings comprise a reversible motor and it will be understood that any other suitable reversible motor means could be utilized.

Selective energization of the two field windings 113 and 114 is controlled by a balanced relay that includes an armature 115 which is pivoted at 116. This armature 115 is provided with legs 117 and 118. A main relay winding 119 and an auxiliary relay winding 120 cooperate with the leg 117. Similarly, a main relay winding 121 and an auxiliary relay winding 122 cooperate with the leg 118. A switch arm 123 is secured to the armature 115 by means of a block of insulating material 124. This switch arm 123 is normally disposed intermediate the pair of opposed contacts 125 and 126 and, upon proper relative energizations of the main relay windings 119 and 121, is adapted to selectively engage one or the other of these contacts.

Low voltage power is supplied to the motor mechanism 53 and the associated controlling devices by a step down transformer generally indicated at 127. This transformer includes a low voltage secondary 128 and a high voltage primary 129, the latter being connected to suitable line wires 130 and 131. The main relay windings 119 and 121 are connected in series across the secondary 128 by a circuit as follows: Secondary 128, wire 132, wire 133, wire 134, main relay winding 119, wire 135, wire 136, main relay winding 121, wire 137, wire 138 and wire 139 to the other side of secondary 128. The lower end of main relay winding 119 is connected to the upper end of balancing resistance 95 and to a contact 140 of the switching mechanism 80 by means of wires 134, 141, 142 and 143. The lower end of main relay winding 121 is connected to the lower end of balancing resistance 95 by wires 137 and 144. It is also connected to a contact 145 of a single pole double throw switch and to a contact 146 of the switching mechanism 80 by wires 137, 147 and 148. The junction of wires 135 and 136 is connected to the balancing contact 96, through a rheostat 149, by wires 150, 151 and 152. This junction is also connected to the switch arm 153 of the single pole double throw switch by wires 150 and 154. The remaining contact 155 of the single pole double throw switch is connected to a third contact 156 of the switch mechanism 80 by means of a wire 157.

The switch arm 158 which cooperates with the contact 140 is connected to the left hand end of control resistance 65 and to the right hand end of compensating resistance 78 by wires 159, 160 and 161. Similarly, the switch arm 162 which cooperates with the contact 146 is connected to the right hand end of control resistance 65 and to the left hand end of compensating resistance 78 by wires 163, 164 and 165. The remaining switch arm 166 of the switching mechanism 80 is connected to the center of corrector resistance 66 by wires 167 and 168 and is also connected to the compensating arm 72, through a rheostat 169, by wires 167, 170 and 171.

From the above description of the wiring, it will be seen that the main relay windings 119 and 121 in series, the control resistance 65 and the compensating resistance 78 and the balancing resistance 95 are all connected in parallel across the secondary 128. It will further be seen that a point intermediary to relay windings 119 and 121 is connected to the control arm 58, the compensating arm 72 and the balancing contact 96, although some of these connections go through resistances the purpose of which will be explained hereinafter. With the parts in the position shown, the energizations of the two main relay windings 119 and 121 are equal, wherefore, switch arm 123 is intermediary contacts 125 and 126 and is not engaging either of them. In order to bring about this balanced relationship the balancing contact 96 is engaging the center of balancing resistance 95. The follower 103 is therefore engaged with the high portion 99 of the cam 97 so that switch arms 101 and 102 are in engagement. Compressor motor 41 is therefore energized as follows: Line wire 175, wire 176, wire 177, switch arm 101, switch arm 102, wire 178, compressor motor 41, wire 179 and wire 180 to the other line wire 181. The follower 108 is engaging the low portion 105 of cam 98 wherefor switch arms 106 and 107 are separated. The compressor 39 is therefore in operation to supply an intermediate amount of refrigerant to the cooling or evaporating coil 38, wherefor the air passing through the condition chamber 10 is cooled to some extent. If the return air temperature should drop somewhat, the control arm 58 will move along control resistance 65 towards its right hand end. A part of the resistance 65 which was formerly connected in parallel with the main relay winding 121 is now connected in parallel with the main relay winding 119. As a result, more current will flow through the right hand portion of resistance 65 and less will flow through the main relay winding 121. At the same time, more current will flow through the main relay winding 119 and less will flow through the left hand portion of resistance 65. In this manner, the main relay winding 119 becomes more highly energized than the main relay winding 121 wherefor armature 115 is rotated in a clockwise direction so that switch arm 123 moves toward contact 125. When this drop in return air temperature is sufficient, switch arm 123 will engage contact 125 whereupon a series circuit through the auxiliary winding 120 and the field winding 114 will be established as follows: Secondary 128, wire 132, wire 182, switch arm 123, contact 125, wire 183, auxiliary winding 120, wire 184, field winding 114, wire 185 and wire 139 to the other side of secondary 128. Energization of auxiliary winding 120 increases the force intended to rotate armature 115 in a clockwise direction whereby the contact pressure of switch arm 119 with contact 123 is increased. Energization of field winding 114 causes rotor 112 to rotate in such a direction that main shaft 52 is driven in a clockwise direction as viewed from the left. Balancing contact 96 thereupon moves upwardly along balancing resistance 95 and the low portion 100 of cam 97 moves towards the follower 103 of switch arm 101. This upward movement of balancing contact 96 along balancing resistance 95 places more of the balancing resistance 95 in parallel with main relay winding 121 and removes some of the balancing resistance 95 in parallel with the main relay winding 119. The energization of relay winding 119 therefor decreases and the energization of relay winding 121 increases. When the energizations of these two relay windings have again been nearly enough equalized, the armature 115 will rotate in a counter clockwise direction sufficiently far to separate switch arm 123 from contact 125. The series circuit through auxiliary winding 120 and field winding 114 is thereby interrupted. The deenergization of auxiliary winding 120 removes the additional force which tended to rotate armature 115 in clockwise direction, wherefor it will move further in a counter clockwise direction, and switch arm 123 will separate more widely from contact 125. Upon deenergization of field winding 114, further rotation of main shaft 52 will cease. In this manner, upon fall in temperature of the return air the main shaft 52 is rotated in a clockwise direction as viewed from the left. If this fall be sufficient, then main shaft 52 will move to an extreme position in which balancing contact 96 engages the upper end of balancing resistance 95. Under these conditions, the switch arm 101 is separated from the switch arm 102 so that neither compressor motor is energized.

Whenever there is a rise in the temperature of the return air, control arm 58 moves along control resistance 65 towards its left hand end. This places more of the control resistance 65 in parallel with main relay winding 121 and removes some of it from its parallel relationship with the main relay winding 119. Main relay winding 121 therefor becomes more highly energized than main relay winding 119, and switch arm 123 moves into engagement with contact 126. This establishes a series circuit through the auxiliary winding 122 and the field winding 113 which is as follows: Secondary 128, wire 132, wire 182, switch arm 123, contact 126, wire 186, auxiliary winding 122, wire 187, field winding 113, wire 185 and wire 139 to the other side of secondary 128. Energization of field winding 113 causes rotation of main shaft 52 in a counter clockwise direction so that balancing contact 96 moves downwardly along balancing resistance 95. Such movement of balancing contact 96 tends to rebalance the energization of main relay windings 119 and 121 so as to disengage switch arm 123 from contact 126.

In this manner, main shaft 52 follows the movements of control arm 58. The control arm 58 need only traverse a small portion of control resistance 65 in order to cause main shaft 52 to move from one of its extreme positions to the other of its extreme positions. When the main shaft 52 is in that extreme position wherein balancing contact 96 engages the upper end of balancing resistance 95, both compressor motors are deenergized as noted above. As the main operated shaft 52 rotates in counter clockwise direction and moves through approximately one-third of its total range of movement, switch arm 101 engages switch arm 102 to energize compressor motor 41 by the circuit set forth above. Continued counter clockwise rotation of main shaft 52 until it has traversed substantially two-thirds of its total range of movement causes the high portion of 104 of cam 98 to engage follower 108 whereupon switch arm 106 engages contact 107 and compressor motor 42 is energized as follows: Line wire 175, wire 176, wire 188, switch arm 106, switch arm 107, wire 189, compressor motor 42, wire 190 and wire 180 to line wire 181.

In this manner, relatively small variation in the return air temperature causes the compressor motors 41 and 42 to be sequentially energized upon temperature rise and to be sequentially deenergized upon fall in temperature.

The purpose of the compensating outdoor temperature responsive device 70 is to select that portion of the total range of the controller 56 which will be operative to move the main shaft 52 throughout its total range of movement. It will be noted that a rise in outdoor temperature causes compensating arm 72 to move towards the left hand end of compensating resistance 78. This removes part of the compensating resistance 78 from its parallel relationship with the main relay winding 121 and places more of the compensating resistance 78 in parallel with the main relay winding 119. This causes an increase in the energization of the main relay winding 119 and a decrease in the energization of main relay winding 121, for any given position of the controller 56. Therefore, the main shaft 52 will move in clockwise direction in order to rebalance the energizations of the main relay windings 119 and 121. This result is the same that follows from a drop in return air temperature. Stated in another way, the rise in outdoor temperature has raised the control point of the main controller 56 so that in order for the main shaft 52 to assume any given position the return air temperature must rise to a higher value than before. On fall in outdoor temperature the reverse action takes place in that the control point of the return air temperature controller 56 is lowered. With the values given above for the controller 56 and compensator 70, when the outdoor temperature is 75° F., the controller 56 will maintain the return air temperature at substantially 75° F. Then, for each 3° rise in outdoor temperature the return air temperature will be raised 1° so that when the outdoor temperature reaches 105° F. the return air temperature will be maintained at 85° F. In this manner, an increased differential between the outdoor and indoor temperatures is maintained as the outdoor temperature rises from 75° F. to 105° F. For temperatures above 105° F. no further correction of the control point of the controller 56 can take place so that even though the outdoor temperature rises above 105° F., the return air temperature will be maintained at 85° F. Also, if the outdoor temperature falls below 75° F. the return air temperature will still be maintained at 75° F.

The purpose of rheostat 169 is to prevent complete short circuiting of either of the main relay windings 119 or 121 upon extreme movements of the compensator 70. Were it not for this rheostat 169, if the compensator 70 moved to one of its extreme positions, the return air controller 56 would lose control of the system. The purpose of the rheostat 149 is to vary the amount of movement required by the return air temperature controller 56 in order to move main shaft 52 throughout its complete range of movement.

The purpose of corrector resistance 66, a portion of which is placed in the circuit whenever the controller 56 moves from its middle portion, is to maintain the operating differential of the controller 56 substantially constant irrespective of which part of its complete range or differential is being utilized to control the motor mechanism 53.

For a more thorough understanding of compensated systems of this type, reference may be had to my co-pending application Serial No. 38,946 filed September 3, 1935.

When the outdoor temperature falls sufficiently that heating is desired rather than cooling, then switch 80 is thrown to its opposite position. Also, the switch arm 153 is disengaged from contact 155 and moved to engage with contact 145. This directly short circuits main relay winding 121 by a circuit as follows: From the upper end of main relay winding 121, wire 136, wire 150, wire 154, switch arm 153, contact 145, wire 147, and wire 137 to the lower end of main relay winding 121. The main shaft 52 will therefor move to its extreme position while moving in a clockwise direction so that balancing contact 96 engages the upper end of balancing resistance 95. When this position is reached, as well as when the other extreme position is reached, the usual limit switches (not shown) serve to prevent further rotation of main shaft 52. The motor mechanism 53 is now in its inoperative position wherein neither compressor motor 41 or 42 is or can be energized. This is the winter position of the motor mechanism 53.

In placing the system in condition for winter operation the switch arm 200 of a single pole double throw switch is also moved from the contact 201 and engaged with the contact 202. This in a manner to be hereinafter described causes the heating control means to be moved from an extreme off position to a position determined by the temperature responsive controller 56. When the triple pole double throw switch 80 is moved to the upper position, the control means 53 for the compressor motors is completely disconnected from the controller 56 and the control means 35 for the steam supply valve 30 is placed under the control of the temperature responsive controller 56. The switch 80 and the two single pole double throw switches therefore act to place the system from summer operation to winter operation and vice versa.

As noted hereinbefore, the supply of steam to the coil 28 in the conditioning chamber 10 is controlled by means of a valve 30, this valve being actuated through a rack and pinion 32, 33 by means of a shaft 34 to which said pinion is attached, said shaft being driven by the proportioning motor 35. The proportioning motor 35 is similar in all respects to the proportioning motor 53 described in detail above. The shaft 34 is rotated through a gear train 300 by means of a shaft 301 to which is attached motor rotors 302 and 303. The shaft 34 is also provided with a balancing contact 304 similar to the balancing contact 96 of motor 53. Cooperating with the rotor 302 is a field coil 305, and cooperating with rotor 303 is a similar field coil 306. The rotors 302 and 303 together with the field coils 305 and 306 constitute a reversible motor similar to that described in connection with the proportioning motor 53. Selective energization of the field coils 305 and 306 is controlled by means of a balanced relay that includes an armature 307 which is pivoted at 308. Armature 307 is U-shaped, having legs 309 and 310 cooperating with main relay windings 311 and 312 respectively. Also cooperating with the legs 309 and 310 are auxiliary windings 313 and 314. Secured to armature 307 by means of an insulating connection 315 is a contact arm 316 which is arranged to selectively engage the contacts 317 and 318. When armature 307 is tilted clockwise the contact arm 316 engages contact 317 while upon counter-clockwise rotation of armature 307 the contact arm 316 is brought into engagement with the contact 318. The position of the armature 307 is controlled by the respective energizations of the main coils 311 and 312. When the energizations of these coils are balanced, armature 307 assumes an intermediate position and the contact arm 316 does not engage either contact 317 or contact 318. When coil 312 is energized to a greater extent than coil 311, armature 307 is rotated counter-clockwise bringing arm 316 into engagement with contact 318. Similarly, when coil 311 is energized more highly than coil 312, contact arm 316 is brought into engagement with the contact 317. Energization of field coils 305 and 306 is derived from the low voltage secondary 320 of the transformer 321. Transformer 321 includes a high voltage primary 322 which is connected to any suitable high voltage line wires. The right hand end of low voltage secondary 320 is connected to the junction of field coils 305 and 306 by means of wires 323 and 324. The left-hand end of secondary 320 is connected by wires 325 and 326 to the contact arm 316. The contact 318 is connected to the auxiliary relay coil 314 by wire 327, the other end of auxiliary relay coil 314 being connected by a wire 328 to motor field coil 305. The contact 317 is connected to the auxiliary relay coil 313 by a wire 329, said relay coil being in turn connected to the motor field 306 by wire 330. Thus when contact arm 316 engages the contact 318 the motor field coil 305 is energized by a circuit as follows: transformer secondary 320, wire 325, wire 326, contact arm 316, contact 318, wire 327, auxiliary relay coil 314, wire 328, motor field coil 305, wire 324 and wire 323 to the other side of the transformer secondary. In a similar manner the motor field coil 306 and the auxiliary relay coil 313 are energized when contact arm 316 engages the contact 317.

The main relay coils 311 and 312 are connected in series across secondary 321 by means of wires 325, 331, 332, 334, 336, 337 and 323. The balancing resistance 340 which cooperates with the balancing contact 304 is also connected across the secondary 320, the connection comprising wires 325, 331, 341, 342, 343, 337 and 323. The control resistance 65 of controller 56 and the compensating resistance 78 of the compensating controller are also connected across the secondary of transformer 320 when the switch 80 is in its upper position. The left-hand end of control resistance 65 and the right-hand end of compensating resistance 78 are connected to the right-hand end of transformer secondary 320 as follows: wires 323, 337, 345, 346, 347, contact 201 of the single pole double throw switch, wire 348, wire 349, contact 203 of switch 80, switch arm 158, wire 159, wire 160 and wire 161. In a similar manner the right-hand end of control resistance 65 and the left-hand end of compensating resistance 78 are connected to the left-hand end of secondary 320 by the following connections: wires 325, 331, 341, 350, contact 204 of switch 80, switch arm 162 and wires 163, 164 and 165. Transformer secondary 320 at one side is connected also to one side of the control resistance 89 of the limit control device 81 by means of wires 325, 331, 341 and 351. The other side of the secondary 320 is connected to the opposite end of control resistance 89 by wires 323, 337, 345, 346, 347, 348, resistance 352 and wire 353. It should therefore be apparent that the control resistance 89 in series with the resistance 352 are connected across the secondary 320 along with the balancing resistance 340, the control resistance 65, the compensating resistance 78, and the relay coils 311 and 312 in series. The upper or connected ends of relay coils 311 and 312 are connected by wires 334, 354, 355, rheostat 356 and wire 357 to the balancing contact 304. These same ends of the main relay coils 311 and 312 are also connected to the control arm 83 of controller 81 by means of wires 334, 354, 358, switch arm 200, contact 202 and wire 359. When the temperature of the delivered air is above 63° F. the bellows 84 will move the bell crank clockwise to engage the control arm 83 with the extreme end of control resistance 89. For this condition the corrector arm 59 of controller 56 and the compensating arm 72 of controller 70 are connected to the connected ends of main relay coils 311 and 312 by wires 334, 354, 358, switch arm 200, contact 202, wire 359, control arm 83, wire 353, wire 360, contact 205, switch arm 156, wires 167, 168 and 170, rheostat 169 and wire 171. The control resistance 89 and the resistance 352 are of the same value. Thus when the control arm 83 is moved under the action of bellows 84 to the extreme right-hand end of control resistance 89 the control arms 59 and 72 of controllers 56 and 70 respectively are connected directly to the connected ends of the main relay coils 311 and 312, and also these connected ends of relay coils 311 and 312 are connected to the electrical center of the combined resistances 89 and 352. In this position, therefore, the resistance 352 balances out the effect of the control resistance 89 upon the relative energizations of main relay coils 311 and 312.

In the winter cycle the compensating arm 72 of controller 70 will be moved by the bellows 73 and spring 77 to engage the extreme right-hand portion of the compensating resistance 78. As explained hereinbefore, the effect of such position upon the controller 56 will be to adjust the control point of that controller to maintain a return air temperature of 75° F. The operating range of controller 56 will thus occur in the extreme right-hand portion of control resistance 65. Assuming the return air temperature is at 75° F. the control arm 59 will be moved to the center of its operating range on the control resistance 65 as determined by the compensating controller 70. The controller 56 under this condition will have no unbalancing effect upon the relative energization of the main relay coils 311 and 312. If the delivered air temperature is above 63° F. the control arm 83 will engage the extreme end of control resistance 89 and this will have no unbalancing effect upon the energization of relay coils 311 and 312. Furthermore this position of arm 83 will directly connect the control arm 59 to the connected ends of relay coils 311 and 312. Under these conditions, therefore, the shaft 34 will be rotated to a position at which the balancing arm 304 engages the center of the balancing resistance 340, thereby causing balancing of the energizations of relay coils 311 and 312 which causes the motor to stop in this position.

Should the return air temperature rise, the bellows 60 will expand thus moving control arm 58 counter-clockwise. This will have the effect of increasing the portion of the control resistance 65 which is in parallel with the main relay coil 311 and decreasing the portion of control resistance 65 which is in parallel with the main relay coil 312. This will cause relay coil 311 to be energized to a greater extent than relay coil 312, thereby causing armature 309 to rotate clockwise, thus engaging contact arm 316 with the contact 317. Engagement of arm 316 with contact 317 energizes motor field 306 and auxiliary relay coil 313. The energization of motor field 306 causes rotation of shaft 301 in a counter-clockwise direction as viewed from the left, this causing the valve to be moved towards closed position. Movement of shaft 34 in a direction to close the valve moves the balancing arm 304 in a clockwise direction, thus decreasing the portion of resistance 340 in parallel with main relay coil 311 and increasing the portion of such resistance in parallel with relay coil 312. This has the effect of decreasing the current flow in coil 311 and increasing the current flow of coil 312. When the movement of the balancing arm 304 is sufficient to balance the current flows in the relay coils 311 and 312, the armature 309 will move towards mid-position thus moving contact arm 316 from engagement with contact 318 thereby causing stopping of the motor with the valve in this new position. Should the temperature of the return air fall, a reverse action will take place in a manner which should be apparent, thus causing the motor 35 to increase the opening of the valve 30 under such conditions. It should therefore be apparent that upon temperature rise of the return air the valve 30 will be moved graduating towards closed position while upon fall of the return air temperature the steam valve 30 will be moved gradually towards open position.

Should the temperature of the delivered air fall below 63° F., for instance to 61.5° F. (as shown), the portion of the resistance 89 which is in parallel with relay coil 311 will be decreased and the portion of said resistance which is in parallel with relay coil 312 will be increased. This will cause a greater current flow in relay coil 312 than occurs through relay coil 311. The armature 307 will thus move in a counter-clockwise direction engaging the contact arm 316 with contact 318 thus causing energization of the motor field 305 which acts to move the valve towards open position. Upon the valve being moved towards open position the balancing arm 304 will be moved in a counter-clockwise direction thus increasing the portion of the balancing resistance 340 which is in parallel with relay coil 311 and decreasing the portion of said resistance which is in parallel with the relay coil 312, this causing reduction in the energization of coil 312 and increasing the energization of the relay coil 311. When the valve has been moved sufficiently open to move balancing arm 304 sufficiently to cause balancing of the energizations of relay coils 311 and 312, armature 307 will be moved to mid-position and the motor 35 will thus stop at this point.

Should the temperature of the delivered air fall as low as 60° the control arm 83 will be moved into engagement with the extreme left-hand end of control resistance 89. This will have the effect of completely short-circuiting the relay coil 311 by a circuit as follows: wires 334, 354, 358, switch arm 200, contact 202, wire 359, control arm 83 and wires 351, 341 and 332. The short-circuiting of relay coil 311 will completely unbalance said relay causing armature 307 to move in a counter-clockwise direction thereby bringing contact arm 316 into engagement with contact 318 for causing movement of the valve towards open position. At this time movement of the balancing arm 304 along the balancing resistance 340 will be incapable of balancing the energizations of the relay coils until balancing arm 304 engages the extreme lower end of balancing resistance 340 at which time the relay coil 312 will also become short-circuited and the valve will be in wide open position. It is to be understood that when the valve reaches wide open position energization of the motor field 305 will be broken by a suitable limit switch (not shown).

From the foregoing it should be apparent that when the temperature of the delivered air is above 63° F. the control arm 83 will engage the extreme right-hand end of control resistance 89 thus leaving the return air temperature controller 56 under complete control of the motor 35, this controller acting to graduatingly vary the opening of valve 30 in accordance with the return air temperature to maintain the temperature of said return air at approximately 75° F. When, however, the delivered air temperature falls below 63° F. the controller 81 will tend to unbalance the energization of the relay coils 311 and 312 in a direction to cause further movement of the steam supply valve towards open position. It should also be apparent that the greater the fall in the return air temperature below 63° F. the further the control valve will be required to open before the balancing arm 304 will balance out the unbalancing effect of control resistance 89 upon the energization of relay coils 311 and 312. Also, when the delivery air temperature falls as low as 60° F. the steam valve will be moved to wide open position. The controller 56 thus acts to maintain the return air temperature at approximately 75° F. while the controller 81 acts to prevent the delivered air temperature from falling below a predetermined value.

It should be observed that when the switch arm 200 of the single pole double throw switch is moved into engagement with the contact 201 the relay coil 312 will be completely short-circuited by a circuit as follows: wire 334, wire 354, wire 358, switch arm 200 and wires 347, 346, 345 and 336 to the other side of relay coil 312. This will completely unbalance the relay causing armature 307 to move contact arm 316 into engagement with contact 317 this having the effect of moving the valve towards closed position. Due to the complete short-circuit, the balancing arm 304 will be incapable of balancing the relay until the valve has been moved at least to fuly closed position, at which time further movement will be prevented by the usual limit switch (not shown). This is the summer position for valve 30.

As noted hereinbefore, the fresh air damper 26 is actuated by means of a motor 23, this motor 23 being controlled by the control potentiometer 54—55 which is adjusted by the motor 53, and also by the control potentiometer 36—37 which is adjusted by the motor 35.

The motor shaft 24 of the damper positioning motor 23 is driven through a gear train 365 by a shaft 366 upon which are mounted motor rotors 367 and 368. A field coil 369 cooperates with the motor rotor 367 and a similar field coil 370 cooperates with the motor rotor 368, these motor rotors and field coils together constituting a reversible motor. The shaft 24 also carries a balancing arm 371 which cooperates with a balancing resistance 372. Energization of the field coils 369 and 370 is controlled by means of a balanced relay including an armature 373 which is pivoted at 374. Secured to armature 373 by means of an insulating connection 375 is a contact arm 376 which is arranged to cooperate with contacts 377 and 378. Cooperating with the armature 373 are main relay coils 379 and 380 and auxiliary coils 381 and 382. Power for energizing the relay coils and the motor field coils is derived from a secondary 383 of the step down transformer 384. The primary 385 of said transformer is connected to any suitable line wires. The connections between the motor fields, the auxiliary relay coils, the relay contacts and the secondary 383 are identical with the connections illustrated for the motor 35 and 53 and hence are not here described in detail. Main relay coils 379 and 380 are connected in series across the secondary 383 by wires 386, 387, 388, 389, 390 and 391. The balancing resistance 372 is also connected across the secondary 383, this connection comprising wires 386, 391, 392, 393, 394, 390 and 391. The control resistance 55 is connected across transformer secondary 383 by means of wires 386, 391, 392, 393, 394, 395, 396, 397, 390 and 391. Similarly, the control resistance 37 is connected across the transformer secondary by wires 386, 391, 392, 393, 394, 398, 399, 400, resistance 401, wires 402, 396, 397, 390 and 391. The balancing arm 371 and the control arm 36 are connected to the connected ends of relay coils 379 and 380 by means of wires 388, 403, 404, 405 and 406. The control arm 54 is connected by a wire 407 to the junction of wires 399 and 400.

Going back to the summer cycle, it will be remembered that at this time the switch arm 200 is moved to completely close the valve 30, hence at this time the control arm 36 is engaging the extreme lower end of the control resistance 37. With the control arm 36 in this position, the upper or connected ends of the relay coils 379 and 380 are connected directly to the control arm 54 by wires 388, 403, 405, 406, control arm 36, wire 399 and wire 407. It is to be observed that the entire control resistance 37 is then connected in parallel with the relay coil 379 by wires 387, 391, 392, 393, 394, 398, control arm 36, and wires 406, 405, 403 and 388. The resistance 37 alone would thus tend to decrease the current flow through relay coil 379. This unbalancing effect of resistance 37, however, is counteracted by the resistance 401 which will be at the same time connected in parallel with the relay coil 380 by means of wires 388, 403, 405, 406, control arm 36, and wires 399, 400, 402, 396, 397 and 389. The resistance 401 is made of the same value as the resistance 37. In this manner the unbalancing effect of the control resistance 37 on the balanced relay is counteracted by the resistance 401. Summarizing, when the system is operating on the summer cycle, the control arm 36 is moved to the extreme end of control resistance 37, this connecting the control arm 54 directly to the connected ends of the relay coils 379 and 380, the unbalancing effect of the extreme position of control arm 36 being nullified by an equal and opposite unbalancing effect of resistance 401.

With the parts in the position shown, the control arm 54 is engaging the center of control resistance 55 and the balancing arm 371 is engaging the center of balancing resistance 372, this causing equal energization of relay coils 379 and 380 thereby causing contact arm 376 to be disengaged from both contact 377 and contact 378. Should the temperature of the return air rise, the controller 56 in the manner previously described will cause the motor 53 to move shaft 54 in a counter-clockwise direction. This will cause the contact arm 54 to be moved counter-clockwise, thereby decreasing the portion of control resistance 55 in parallel with the relay coil 380 and increasing the portion of said resistance in parallel with the relay coil 379. This will have the effect of increasing the current flow through coil 379 and decreasing the current flow through coil 380, this in turn causing engagement of contact arm 376 with contact 377 which acts to energize the motor field coil 370, this rotating shaft 368 in a direction to move damper 21 towards closed position. Simultaneously with the moving of damper 21 towards closed position the balancing arm 371 will be rotated in a clockwise direction along balancing resistance 372. This decreases the portion of resistance 372 in parallel with relay coil 379 and increases the resistance in parallel with relay coil 380, this having the tendency of rebalancing the relative energization of relay coils 379 and 380. When the movement of balancing arm 371 (and damper 21) is sufficient to cause rebalancing of the relay the motor will stop with the damper in this new position.

If the return air temperature should fall, the motor 53 will be caused by the controller 56 to rotate in a clockwise direction thus rotating control arm 54 in a clockwise direction. This will have the effect of unbalancing the relay of motor 23 to cause the motor to move in a direction opposite to that just described, thus moving the damper towards open position. It should be apparent, therefore, that under the summer cycle the movement of motor 53 in a direction to increase the number of compressors in operation will cause movement of the damper 21 in a direction to decrease the flow of outside or fresh air. Similarly, when the return air temperature falls thus indicating lower refrigeration load and hence lower outside temperature, the motor 53 will be moved in a direction to place one compressor or both out of operation and this movement of motor 53 will cause the motor 23 to move the damper towards open position. The arrangement is preferably such that when both compressors are out of operation thus indicating that the outside air temperature is approximately the same as the inside air temperature, the damper 21 will be moved towards wide open position, while when both compressors are placed into operation the damper will be moved towards closed position thus restricting the flow of fresh air at this time. The closure of the damper at this time (when the refrigerator load is high) restricts the amount of fresh air that must be cooled, thereby decreasing the refrigeration load.

Under winter operation it is to be remembered that the motor 53 will be caused by movement of switch arm 153 into engagement with contact 145, to move to an extreme clockwise position in which both compressors are placed out of operation. At this time the control arm 54 will be in engagement with the extreme lower end of the control resistance 55. With the control arm in this position, the entire resistance 55 will be connected in parallel with the relay coils 379 and 380 by wires 389, 397, 396, 395, 394, 393, 392, 391 and 387. At this same time the resistance 401 will also be connected in parallel with both relay coils 379 and 380 by wires 389, 397, 396, 402, 400, 407, control arm 54, wire 394 and wires 393, 392, 391 and 387. This parallel relationship of both resistance 401 and 55 with the relay coils 379 and 380 in series, while effecting the current flow through both relay coils, will not affect the relative energization of said coils. Therefore, the control arm 36 in cooperation with the control resistance 37 is in complete control of the motor 23 and hence the damper 21.

Should the return air temperature fall (assuming the apparatus to be in other than an extreme position) the temperature controller 56 in a manner previously described will cause opening of the steam valve 30, this movement also causing counter-clockwise rotation of the control arm 36. This will have the effect of decreasing the portion of resistance 37 in parallel with the relay coil 379 and increasing the portion of said resistance in parallel with relay coil 380. This causes a greater current flow in coil 380 than in coil 379, thus causing armature 374 to move contact arm 376 into engagement with contact 378, this causing energization of motor field 369 which causes rotation of shaft 24 in a direction to close damper 21. Simultaneously with movement of damper 21 towards closed position, the balancing arm 371 will be moved in a counter-clockwise direction thus decreasing the portion of the resistance 372 which is in parallel with relay coil 380 and increasing the portion of said resistance in parallel with relay coil 379. This will tend to rebalance the energizations of the relay coils 379 and 380 and when the movement of the balancing arm 371 is sufficient to cause balancing of the relay, the motor will stop with the damper in this new position. If the temperature of the return air should rise, the controller 56 will act to move the steam valve 30 towards closed position, this moving the control arm 36 in a clockwise direction, this causing movement of the damper 21 towards open position in a manner which will now be apparent. In winter operation, therefore, as the return air temperature falls, the steam valve will be graduatingly opened and simultaneously the fresh air damper will graduatingly be moved towards closed position. Conversely, if the return air temperature should increase the steam valve 30 will be graduatingly moved towards closed position and this movement towards closed position will graduatingly cause the motor 23 to move the damper towards open position. By controlling the damper in the manner described, when weather conditions are mild, the damper will be relatively open, thus allowing a large quantity of air to be circulated for ventilating purposes. When however, weather conditions become severe, the damper is relatively closed, this to some extent economizing on fuel.

It will be noted that the delivery ducts 14 and 15 for rooms 12 and 13 respectively are provided with dampers 410. The damper 410 for each zone is positioned by a proportioning motor 411, the crank of each proportioning motor being connected by a link 412 to the actuating arm 413 of each damper. The proportioning motors 411 are formed similarly to the proportioning motors 35 and 53 and hence are not described here in detail. Each proportioning motor is controlled by a room temperature responsive controller 414 located in the room or spaces supplied with air through that damper, and also by an outdoor compensating thermostat 415. Thermostats 414 and 415 are identical in construction with thermostats 65 and 70 and hence are not here described in detail.

It will be noted that the compensating arm 416 and the control arm 417 are connected to the proportioning motors 411 by means of wires 418, 419, 420, and 421. The ends of the control resistance 422 and the compensating resistance 423 however are not directly connected to the proportioning motor, but are connected to the switch arms 424 and 425 of a reversing switch 426. The outer terminals of the proportioning motor it will be noted are connected to the contacts of reversing switch 426 by wires 427 and 428.

In the position shown, switch 426 is in its summer position. Thus as the room temperature rises, the effect of the movement of control arm 417 in moving across control resistance 422 will be to cause the proportioning motor to be moved towards opening position, thus admitting additional low temperature air. In winter, however, reversing switch 426 is moved to its opposite position. The relationship between the controllers 414 and 415 is now reversed, that is, upon a rising temperature in the room, the proportioning motor will cause the damper to be moved towards closed position, instead of towards open position as in the previous case. By the use of the reversing switch in the manner shown, a single set of controllers thus may be made to operate in both summer and in winter.

It will be understood that the controllers 414 and 415 operate in a manner similar to controllers 56 and 70. In other words, the controller 414 acts to control the zone damper 410 in accordance with the temperature within space 12, while the outdoor temperature compensator 415 acts to determine the temperature which the controller 414 will maintain. When the outdoor temperature is below 75° F., the compensating arm 416 of the controller 415 will engage the extreme right-hand end of the compensating resistance 423. With this position of the compensating arm 416, the operating range of the controller 414 will be shifted to a point adjacent the extreme right-hand end of control resistance 422, this causing the controller 414 to maintain a space temperature of 75° F. Upon increasing outdoor temperature it will be apparent that the compensating controller 415 will cause the controller 414 to maintain progressively higher temperatures within the space, and when the outdoor temperature rises to 105° F. the compensating arm 416 of controller 415 will engage the extreme left-hand end of compensating resistance 423, this having the effect of shifting the operating range of the controller 414 to a point adjacent the left-hand end of control resistance 422. This will cause the controller to maintain a space temperature of 85° F. From the foregoing, it will be apparent that the controller 415 will adjust the indoor controller 414 in a manner to cause the controller 414 to maintain a space temperature which is suitable for winter operation when outdoor temperature is below 75° F. Upon increasing outdoor temperature above this value, however, the controller 414 will be adjusted to maintain higher indoor temperatures.

*Operation*

With the parts in the position shown in Figure 2, the various switches are positioned to place the system upon the cooling cycle. The return duct controller 56 is therefore in control of the proportioning motor 53 which controls the compressors. The switch 80 at this time has completely disconnected the controller 56 from the heating control proportioning motor 35. Also at this time, switch arm 200 of the single-pole double-throw switch is positioned for causing the proportioning motor 35 to completely close off the steam valve 30. No steam is therefore being supplied to the heating coil 28. Also at this time, the control arm 36 of the potentiometer actuated by proportioning motor 35 is in an extreme position which places the potentiometer 54—55 on the proportioning motor 53 in full control of the fresh air damper motor 23. At this time also, the reversing switches 426 for the space temperature responsive controllers 414 are positioned so as to cause said controllers to effect opening of the dampers 410 upon rise in space temperature and for causing closing of said dampers upon fall in space temperature.

With this arrangement of the various change-over switches, it will be apparent that the zone controllers 414 will operate the zone dampers 410 to vary the flow of cooled air into the spaces 12 and 13 in a manner to maintain predetermined temperatures in each of said spaces, the values of which are determined by outside temperature. The controller 56 due to its being responsive to the mixture of air drawn from both spaces in effect is responsive to the average condition of the air in both spaces, and controls the compressors in accordance with this average condition. Thus, if the temperature within one of the zones or both of the zones should increase, the mixture of the air withdrawn from these spaces will likewise increase, this causing the controller 65 to cause rotation of the proportioning motor 53 in a direction for increasing the number of compressors in operation. This will also have the effect of causing the fresh air damper 21 to be closed further, thereby restricting the flow of fresh air into the building as the cooling load increases. Upon falling temperature within either or both of the spaces, the opposite action will take place, namely, the temperature of the mixture of the air will tend to decrease, which will result in the controller 56 causing operation of the motor 53 for reducing the number of compressors in operation, and for increasing the amount of fresh air supplied to the building.

Upon changes in outdoor temperature, both the zone thermostats and the return air thermostat will be adjusted simultaneously. Thus if outside air should increase, the zone controllers will be adjusted to maintain higher temperatures within the individual zones, and the return duct controller will be adjusted to control the compressors in a manner to maintain a correspondingly higher average temperature within the building.

For winter operation of the system, it will be understood that the switch 80 will be shifted to its other position which completely disconnects the return air temperature controller 56 and its compensator 70 from the compressor controlling proportioning motor 53, and places said thermostat 56 in control of the steam valve proportioning motor 35. Also the switch arm 153 of the single-pole double-throw switch will be shifted to its opposite position which causes the proportioning motor 53 to run to an extreme position, thereby placing both compressors out of operation. For this position of proportioning motor 53, the control arm 54 of the control potentiometer 54—55 engages the extreme lower end of the control resistance 55, which places the fresh air damper under the full control of the potentiometer 36—37 which is operated by the steam valve proportioning motor. Also for winter operation, it will be understood that the reversing switches 426 for the zone damper controllers will be shifted to their other positions, this causing the zone thermostats to increase the amount of heated air supplied to the spaces upon fall in temperature within said spaces.

During winter operation, the outdoor temperature will be below 75° F., this causing the controllers 415 to adjust the zone thermostats 414 for maintaining a temperature of 75° F. within each zone. The outdoor temperature being below 75° F. will also cause the thermostat 70 to adjust the duct thermostat 56 for maintaining a return duct temperature of 75° F. The zone controllers 414 will, therefore, control the flow of air individually into each zone to maintain a constant temperature in each zone, and the return duct thermostat 56 will operate to control the steam valve in accordance with the average temperature of all of the spaces. It will be apparent that as the average space temperature decreases, which indicates lowering of the outside temperature, the steam valve 30 will be opened further to carry this increase in heating load and also the fresh air damper 21 will be closed further to restrict the supply of fresh air to the building.

Due to the fresh air damper 21 being arranged for control with the heating means and with the cooling means, the amount of fresh air supplied to the building will be varied in accordance with the temperature of the outdoor air. This result is caused by the fact that the operation of the heating and cooling means is ultimately determined by the heating or cooling load upon the system which is largely dependent upon outdoor weather conditions.

It should be noted that in accordance with the present invention, the amount of air supplied to each of the spaces is individually controlled in accordance with space conditions, and the operation of the heating or cooling means is controlled in accordance with the average demand for heating or cooling of all of the spaces. By controlling the heating and cooling devices in this manner, the system is caused to provide proper ventilation of the spaces at all times. Thus when the outdoor conditions are relatively severe, a large amount of conditioning is necessary and in response to such severe weather conditions, the controller 56 will cause operation of the heating or cooling means at maximum capacity for maintaining a constant return air temperature. As outdoor conditions become milder, less conditioned air for each space will be necessary to maintain proper conditions, and the zone controller will act to restrict the flow of air into each space accordingly. At this time also, the duct controller 56 will act to reduce the total amount of conditioning being done, this action avoiding the necessity of the zone dampers becoming completely closed in order to prevent overcooling or overheating of the zones. By thus reducing the amount of conditioning done when the conditioning load decreases, proper ventilation of the zones is provided. It should be additionally noted that as the operation of the air conditioning apparatus is reduced, the amount of fresh air supplied to the building is increased. Therefore, during mild weather conditions, a large amount of fresh air will be supplied to the system, and due to the dampers 410 being allowed to remain open by the reduction in the amount of conditioning done, a large quantity of fresh air is supplied to the zones for ventilation purposes.

From the foregoing it should be seen that I have provided an air conditioning system which operates to cool a plurality of spaces or enclosures during the summer and to heat such spaces or enclosures during the winter. It should be further apparent that automatic control is secured under both summer and winter operation by means of a controller responsive to the average condition of the various zones and in which the control point of such controller is automatically changed from a value suitable for winter operation to progressively increasing value as the outside temperature progressively increases, thereby maintaining a constant temperature during the winter operation and a temperature which varies with outdoor temperature under a predetermined schedule during summer operation. Also it should be seen that during winter operation the temperature of the delivered air is automatically prevented from falling below a predetermined value, the supply of heat to effect this result being progressively increased as this delivery air temperature approaches a predetermined minimum value. Also it should be apparent that the fresh air damper is automatically controlled, it being controlled by the conjoint action of the heating and cooling controllers, the arrangement being such that the heating controller automatically assumes full control of the damper during winter operation and the cooling controller automatically assumes control of such damper during summer operation.

It will be apparent that many changes will suggest themselves to those skilled in the art. I therefore desire to be limited only by the scope of the appended claims and the prior art.

I claim as my invention:

1. In an air conditioning system, in combination, means to supply fresh and return air to a space, damper means in control of the supplying of fresh and return air to the space, motor means to graduatingly position said damper means, temperature responsive means to graduatingly position said motor means, a plurality of electrically operated devices to condition the air delivered to the space, and a plurality of switches sequentially operated by said motor means for controlling said electrically operated devices.

2. In a heating and cooling system, in combination, means to supply fresh and return air to a space, means to variably cool the air, a first motor means in control thereof, means to variably heat the air, a second motor means in control thereof, means to graduatingly position one or the other of said motor means and to place the other motor means in an extreme position, a third motor means in control of the supplying of fresh and return air to the space, means controlled by the first motor means to operate said third motor means in a manner to decrease the supply of fresh air upon an increase in cooling effect and means controlled by the second motor means to operate the third motor means in a manner to decrease the supply of fresh air upon an increase in heating effect.

3. In an air conditioning system, in combination, means for supplying a stream of air to a space, means for heating said air stream, means for cooling said air stream, motor means in control of said heating means, other motor means in control of said cooling means, means responsive to the temperature of said space, means responsive to outside temperature for adjusting said space temperature responsive means, means for selectively placing said space temperature responsive means in control of one of said motor means or the other, and means responsive to temperature of said air stream for additionally controlling one of said motor means in a manner to prevent said air stream temperature from deviating excessively from the temperature in said space.

4. In an air conditioning system, in combination, means for supplying a stream of air to a space, means for heating said air stream, means for cooling said air stream, proportioning motor means in control of said heating means, other proportioning motor means in control of said cooling means, means responsive to the temperature of said space, selective means for placing said space temperature responsive means in control of one of said motor means or the other, and means responsive to the temperature of said air stream for varying the relationship between said heating control proportioning motor means and said space temperature responsive means as the temperature of said air stream approaches a predetermined limit.

5. In an air conditioning system, in combination, means for supplying a stream of air to a space, said air stream being composed of a mixture of outside and return air, means for controlling the proportion of outside and return air in said mixture, motor means for positioning said mixture controlling means, means for heating the air stream, means for cooling the air stream, motor means in control of said heating and cooling means, said last mentioned motor means also controlling said mixture controlling motor means, and condition responsive means for controlling said heating and cooling controlling motor means.

6. In an air conditioning system, in combination, means for supplying a stream of air to a space, said air stream being composed of a mixture of outside and return air, means for controlling the proportion of outside and return air in said mixture, motor means for positioning said mixture controlling means, means for heating the air stream, means for cooling the air stream, motor means in control of said heating and cooling means, said last mentioned motor means also controlling said mixture controlling motor means, means responsive to the temperature of said space for controlling said heating and cooling controlling motor means, and means responsive to outside temperature for adjusting said space temperature responsive means.

7. In an air conditioning system for a plurality of spaces, comprising, in combination, an air conditioning chamber, delivery duct means connecting said chamber with said spaces for delivering conditioned air thereto, return duct means for returning air from said spaces to said chamber, damper control means for varying the volume of conditioned air delivered to each of said spaces, thermostatic means responsive to the temperature of said spaces for controlling said damper control means, thermostatic means responsive to outside temperature for adjusting said space temperature responsive means, temperature changing means in said conditioning chamber, means responsive to the temperature of said spaces in control of said temperature changing means, and outside temperature responsive means for adjusting said last mentioned space temperature responsive means.

8. In an air conditioning system for a plurality of spaces comprising, in combination, an air conditioning chamber, a condition changer for changing the condition of the air flowing through said conditioning chamber, delivery duct means connecting said chamber with said spaces for delivering conditioned air thereto, return duct means for returning air from said spaces to said chamber, damper control means for varying the volume of conditioned air delivered to each of said spaces, thermostatic means responsive to the temperature of the air in said spaces for controlling corresponding damper control means, thermostatic means responsive to outside temperature for adjusting said space temperature responsive means in accordance with variations in outside temperature, and means responsive to the average demand for conditioning of said spaces for controlling the condition changer.

9. In an air conditioning system for a plurality of spaces comprising, in combination, an air conditioning chamber, a condition changer for changing the condition of the air flowing through said conditioning chamber, delivery duct means connecting said chamber with said spaces for delivering conditioned air thereto, return duct means for returning air from said spaces to said chamber, damper control means for varying the volume of conditioned air delivered to each of said spaces, thermostatic means responsive to the temperature of the air in said spaces for controlling corresponding damper control means, thermostatic means responsive to the average demand for conditioning of said spaces for controlling said condition changer, and means for adjusting said last mentioned thermostatic means to provide for varying the average temperature maintained in said spaces in accordance with variations in outside temperature.

10. In an air conditioning system, in combination, means for selectively supplying heating or cooling medium to a space to be conditioned, valve means for controlling the flow of heating or cooling medium, thermostatic means including a thermostat responsive to the temperature of the conditioned space for controlling said valve means, said thermostatic means being arranged to cause opening of said valve means upon an increase in temperature above the setting of the thermostat for causing cooling of the space, and for causing opening of said valve means when the temperature falls below the setting of the thermostat for causing heating of the space, and means influenced by outdoor temperature for adjusting said thermostatic means, said outdoor temperature influenced means being arranged to adjust said thermostatic means to maintain a space temperature which is suitable for winter operation when outdoor temperature is below a predetermined value, and to progressively raise the temperature maintained by the thermostatic means as outside temperature rises above said predetermined value.

11. In an air conditioning system, in combination, means for selectively supplying heating or cooling medium to a space to be conditioned, valve means for controlling the flow of heating or cooling medium, thermostatic means including a thermostat responsive to the temperature of the conditioned space for controlling said valve means, said thermostatic means being arranged to cause opening of said valve means upon an increase in temperature above the setting of the thermostat for causing cooling of the space, and for causing opening of said valve means when the temperature falls below the setting of the thermostat for causing heating of the space, adjusting means for varying the temperature maintained by said thermostatic means, and condition responsive means for operating said adjusting means to modify the temperature maintained by said thermostatic means in accordance with variations in the condition to which said condition responsive means responds.

12. In an air conditioning system for a space, in combination, means for supplying conditioning medium to a space, means for cooling said medium, means for heating said medium, thermostatic means including a thermostat responsive to the temperature of the conditioned space for controlling said heating means and said cooling means, said thermostatic means being arranged for placing said heating means in operation when the space temperature falls below the setting of the thermostat for heating said space, and for placing said cooling means in operation when the space temperature rises above the setting of the thermostat for cooling said space, and means influenced by outdoor temperature for adjusting said thermostatic means, said outdoor temperature influenced means being arranged to adjust said thermostatic means to maintain a space temperature which is suitable for winter operation when outdoor temperature is below a predetermined value, and to progressively raise the temperature maintained by the thermostatic means as outside temperature rises above such predetermined value.

13. In a nair conditioning system for a space, in combination, means for supplying conditioning medium to a space, means for cooling said medium, means for heating said medium, thermostatic means including a thermostat responsive to the temperature of the conditioned space for controlling said heating means and said cooling means, said thermostatic means being arranged for placing said heating means in operation when the space temperature falls below the setting of the thermostat for heating said space, and for placing said cooling means in operation when the space temperature rises above the setting of the thermostat for cooling said space, adjusting means for varying the temperature maintained by said thermostatic means, and condition responsive means for operating said adjusting means to modify the temperature maintained by said thermostatic means in accordance with variations in the condition to which said condition responsive device responds.

14. In a summer-winter air conditioning system, in combination, a conditioning chamber, means for causing air to be conditioned to flow through said conditioning chamber to a space to be conditioned, heating means in said conditioning chamber for heating the air, cooling means in said conditioning chamber for cooling the air, electrically driven heating control means for controlling the supply of heat to said heating means, electrically driven cooling control means for controlling the cooling medium supplied to said cooling means, a thermostat responsive to the temperature of the space being conditioned for controlling said heating control means and said cooling control means, said thermostat being arranged to cooperate with said cooling control means to effect a cooling action when the space temperature rises too high and for cooperating with said heating control means to effect a heating action when the space temperature falls too low, and switching mechanism for controlling said electrically driven control means independently of said thermostat, said switching mechanism being arranged to selectively cause said cooling control means to be driven to a position for stopping all cooling while leaving said thermostat in control of said heating control means, or to cause said heating control means to be driven to a position for stopping all heating while leaving said thermostat in control of said cooling control means.

15. In an air conditioning system, in combination, a conditioning chamber, means for causing air to flow through said conditioning chamber, a delivery duct for conveying air from said chamber to a space to be conditioned, means for supplying fresh air to said conditioning chamber, automatic means for controlling the supply of fresh air admitted to said chamber in accordance with variations in the condition of said fresh air, a temperature changer in said conditioning chamber, means influenced by the temperature changing load upon the system for controlling said temperature changer in a manner to increase the operation of the temperature changer upon increase in load, and to decrease the operation of said temperature changer upon decrease in load, and means responsive to the temperature of the air flowing through said delivery duct for also controlling said temperature changer, said air temperature responsive means being arranged for controlling said temperature changer in a manner to prevent the temperature of the air flowing into said space from deviating excessively from the temperature of the air in said space.

16. In an air conditioning system, in combination, means for supplying a stream of air to said space, means for heating said air stream, means for cooling said air stream, proportioning motor means in control of said heating and cooling means, thermostatic means in control of said proportioning motor means, said thermostatic means being arranged to cooperate with said proportioning motor means for causing operation of said cooling means upon demand for cooling during summer operation of the system, and for causing operation of said heating means upon a demand for heat during winter operation of the system, and thermostatic means responsive to the temperature of the air being delivered to said space for controlling said proportioning motor means conjointly with said first mentioned thermostatic means, said second thermostatic means being arranged to control graduatingly said proportioning motor means in a manner for preventing the temperature of the delivered air from deviating excessively from the temperature of the air maintained in said space.

17. In a summer and winter air conditioning system, in combination, means for heating and cooling a space, a single controller for controlling the supply of heat to the space in winter and for controlling the cooling of the space in summer, thermostatic means influenced by the temperature in the space, means including reversing means for connecting said thermostatic means to said controller, said last recited means rendering said thermostatic means effective to cause positioning of said controller in a manner to increase the supply of heat to the space upon decrease in space temperature during the winter and to increase the cooling of the space upon increase in space temperature during the summer, and outside temperature influenced thermostatic means for adjusting said space thermostatic means, said outside thermostatic means being arranged to adjust said space thermostatic means to maintain said space temperature at a value suitable for winter operation when outside temperature is below a predetermined value, while increasing the temperature maintained by said space thermostatic means as outside temperature rises above said value.

18. In a summer and winter air conditioning system, in combination, heating means for heating a space, cooling means for cooling said space, thermostatic means influenced by the temperature in said space, connecting means between said space thermostatic means, said heating means and said cooling means, said connecting means including selective means for placing said thermostatic means either in control of said heating means or said cooling means, in a manner to cause increase in heat supply upon increase in demand for heating when said thermostatic means is in control of said heating means, while causing increase in cooling upon increase in demand for cooling when said thermostatic means is in control of said cooling means, and outside temperature influenced thermostatic means for adjusting said space thermostatic means, said outside thermostatic means being arranged to adjust said space thermostatic means to maintain said space temperature at a value suitable for winter operation when outside temperature is below a predetermined value, while increasing the temperature maintained by said space thermostatic means as outside temperature rises above said value.

19. In an air conditioning system, in combination, means to supply fresh and return air to a space to be conditioned, damper means for controlling the supplying of fresh and return air to the space, damper motor means for positioning said damper means, said damper motor means having control line means, cooling means for cooling said space, control means for said cooling means including a movable member and a cooling control motor for positioning said movable member, heating means for said space, control means for said heating means including a second movable member and a heating control motor for positioning said second movable member, means including thermostatic means for controlling said cooling control motor and said heating control motor, a controller positioned by said cooling control motor, a controller positioned by said heating control motor, said controllers being connected to said damper motor control line means in a manner to cause said damper motor to operate in a direction for decreasing the flow of fresh air when either the cooling means or the heating means is placed into operation.

20. In an air conditioning system, in combination, means to supply fresh and return air to a space to be conditioned, damper means for controlling the supplying of fresh and return air to the space, damper motor means for positioning said damper means, said damper motor means having control line means, means for changing the temperature of the air in said space, control means including a movable member for controlling the temperature changing means, a control motor for positioning said movable member, a device responsive to the temperature which said temperature changing means is controlled in accordance with for controlling said control motor for thereby varying the action of said temperature changing means in accordance with the value of said temperature, and a controller positioned by said control motor, said controller being connected to the control line means of said damper motor for causing movement of said damper motor in a direction for decreasing the supply of fresh air when said temperature changing means is placed into operation.

21. In an air conditioning system, in combination, means for selectively heating or cooling a space, a flow controller for controlling the flow of cooling medium during the cooling season and for controlling the flow of heating medium during the heating season, a reversible electric motor for actuating said controller, said motor having a three-wire control circuit, a thermostatic electric current controlling means influenced by the temperature in said space, said thermostatic electric current controlling means being arranged in said control circuit in a manner to cause positioning of said flow controller to increase the flow of cooling medium upon rise in temperature above the setting of the thermostatic electric current controlling means, and for causing increase in flow of heating medium when the temperature falls below the setting of said thermostatic electric current controlling means, adjusting means for adjusting the temperature maintained by said thermostatic electric current controlling means, and condition responsive means for operating said adjusting means to modify the temperature maintained by said thermostatic electric current controlling means in accordance with variations in the condition to which said condition responsive means responds.

22. In an air conditioning system, in combination, means for selectively heating or cooling a space, a flow controller for controlling the flow of cooling medium during the cooling season and for controlling the flow of heating medium during the heating season, a reversible electric motor for actuating said controller, said motor having a three-wire control circuit, a thermostatic electric current controlling means influenced by the temperature in said space, said thermostatic electric current controlling means being connected into said control circuit, a heating-cooling reversing switching mechanism interposed in said three-wire control circuit between said motor and said current controlling means, said reversing switching mechanism acting to cause said thermostatic electric current controlling means to operate said motor for increasing the flow of medium upon rise in temperature when said switching mechanism is in cooling position while causing said thermostatic electric current controlling means to operate said motor for increasing the flow of medium upon fall in temperature when said switching mechanism is in heating position, adjusting means for adjusting the temperature maintained by said thermostatic electric current controlling means, and condition responsive means for operating said adjusting means to modify the temperature maintained by said thermostatic electric current controlling means in accordance with variations in the condition to which said condition responsive means responds.

23. In an air conditioning system, in combination, means for selectively heating or cooling a space, a flow controller for controlling the flow of cooling medium during the cooling season and for controlling the flow of heating medium during the heating season, a reversible electric motor for actuating said controller, said motor having a three-wire control circuit, a thermostatic electric current controlling means influenced by the temperature in said space, said thermostatic electric current controlling means being connected into said control circuit, a heating-cooling reversing switching mechanism interposed in said three-wire control circuit between said motor and said current controlling means, said reversing switching mechanism acting to cause said thermostatic electric current controlling means to operate said motor for increasing the flow of medium upon rise in temperature when said switching mechanism is in cooling position while causing said thermostatic electric current controlling means to operate said motor for increasing the flow of medium upon fall in temperature when said switching mechanism is in heating position, and automatic adjusting means for adjusting the temperature maintained by said thermostatic electric current controlling means, said adjusting means acting to adjust said thermostatic electric current controlling means to a suitable temperature value for heating, and to adjust said thermostatic electric current controlling means to a higher temperature value for cooling.

JOHN E. HAINES.